Figure 1:
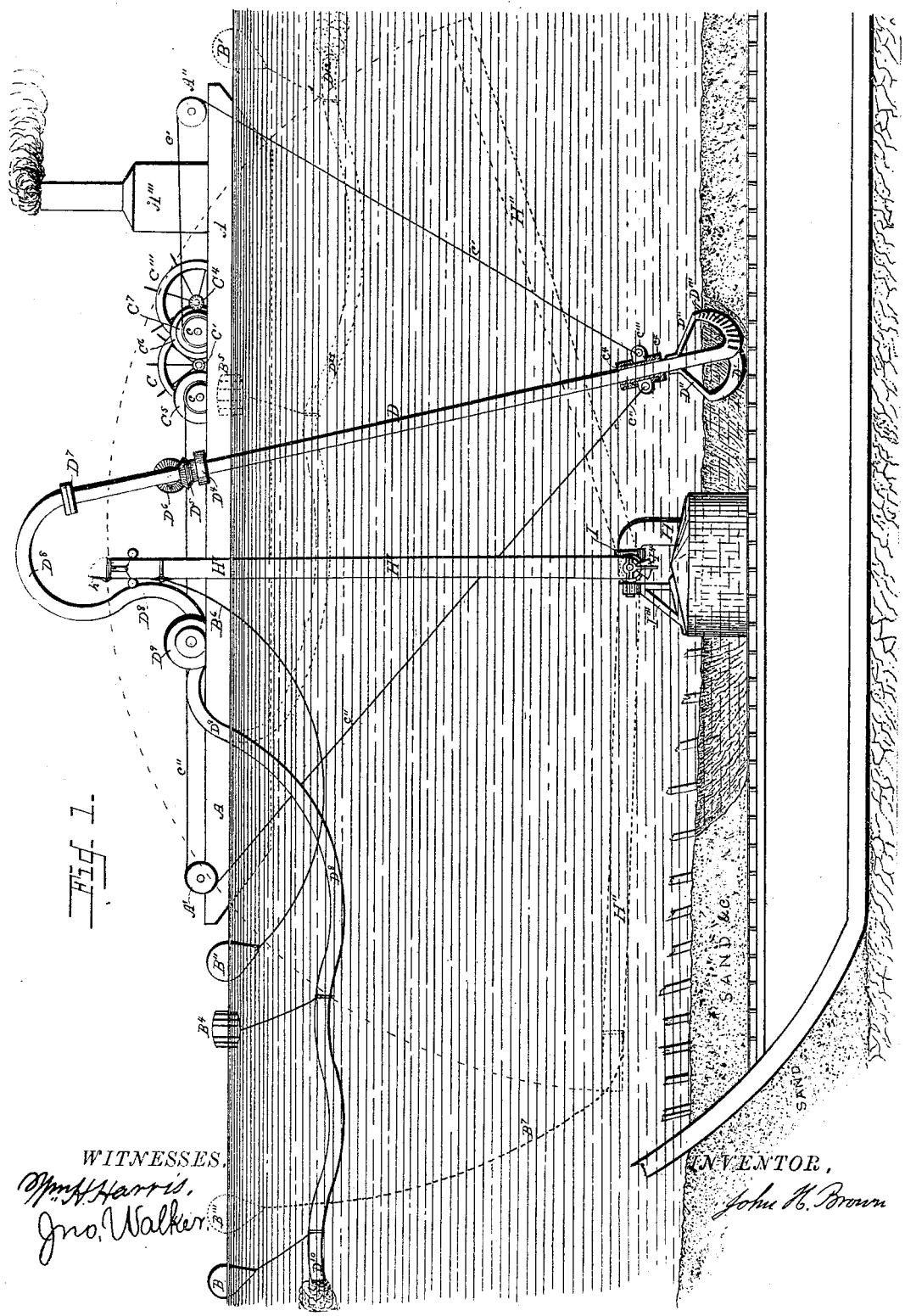

(No Model.) 3 Sheets—Sheet 1.

J. H. BROWN.
APPARATUS FOR RECOVERING VALUABLE CONTENTS FROM SUNKEN SHIPS.

No. 388,257. Patented Aug. 21, 1888.

WITNESSES
Wm. H. Harris
Jno. Walker

INVENTOR
John H. Brown

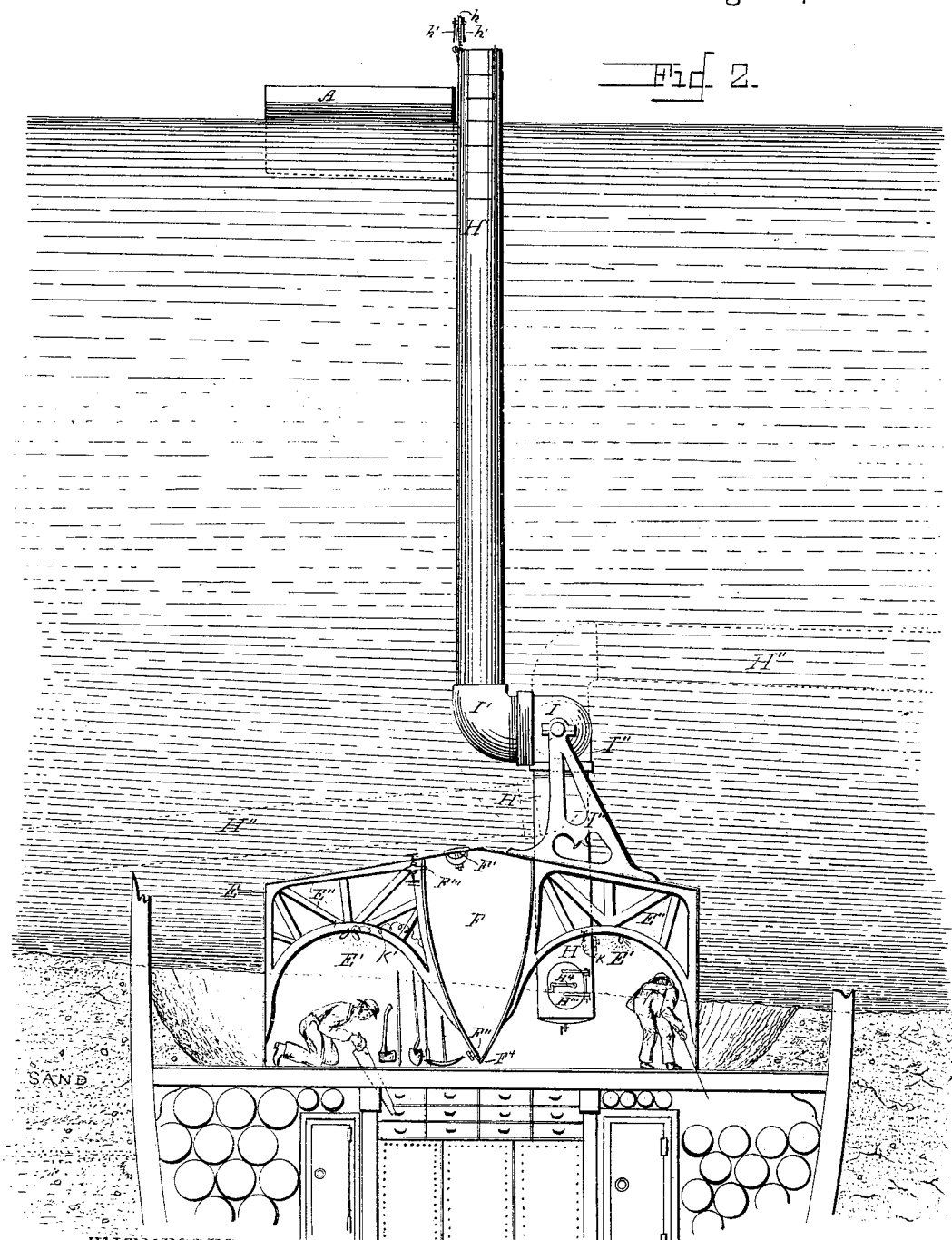

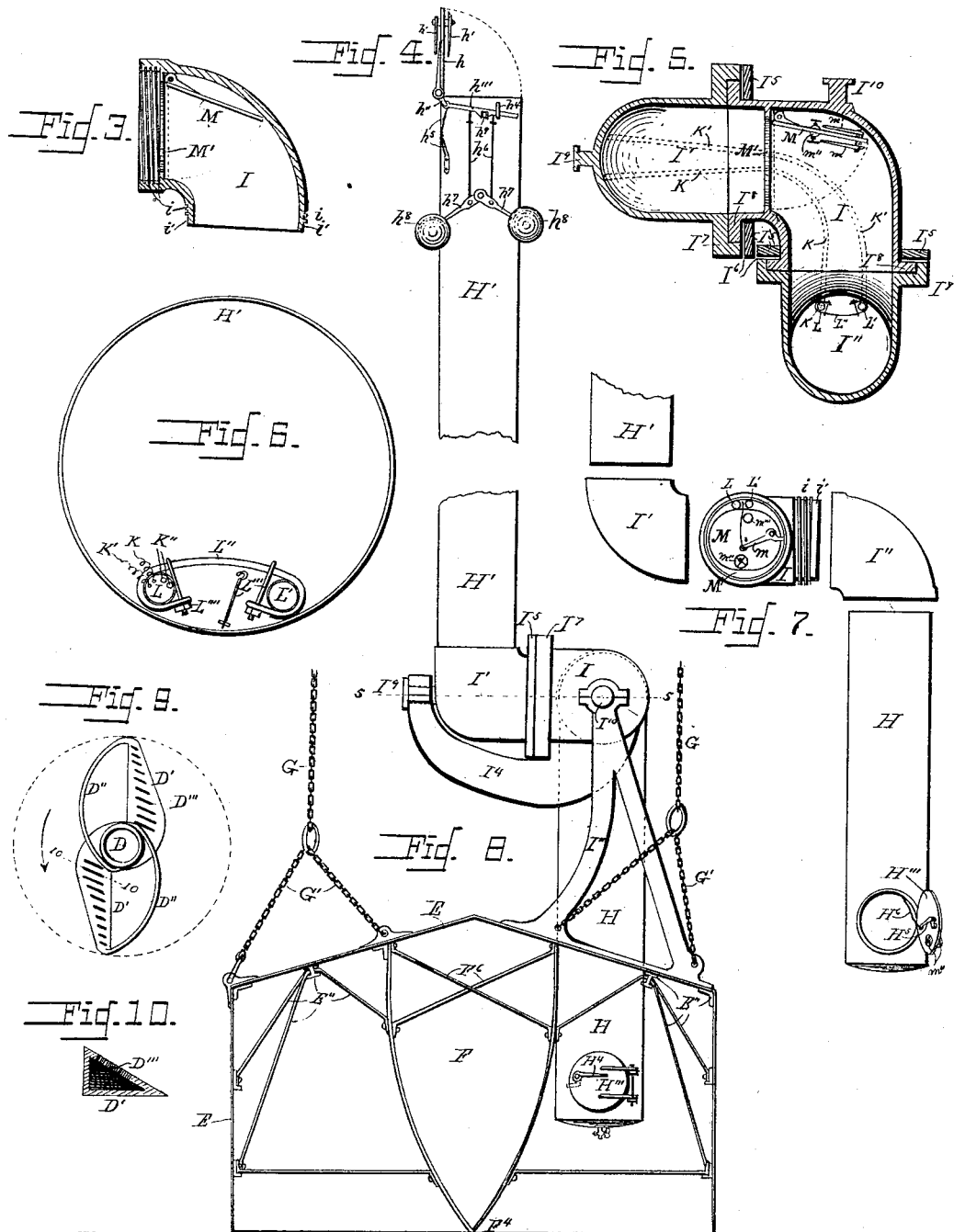

UNITED STATES PATENT OFFICE.

JOHN H. BROWN, OF BALTIMORE, MARYLAND, ASSIGNOR TO MORGAN R. WISE, OF SALERO, ARIZONA TERRITORY.

APPARATUS FOR RECOVERING VALUABLE CONTENTS FROM SUNKEN SHIPS.

SPECIFICATION forming part of Letters Patent No. 388,257, dated August 21, 1888.

Application filed March 16, 1888. Serial No. 267,440. (No model.)

*To all whom it may concern:*

Be it known that I, JOHN H. BROWN, a citizen of the United States, residing at Baltimore, Maryland, have invented new and useful Apparatus for Recovering Valuable Contents from Sunken Ships, of which the following is a specification.

In another application, filed January 12, 1888, Serial No. 260,546, I have shown apparatus and described methods of operating upon sunken ships lying upon rocky or hard impermeable river or sea bottoms subjected to swift-running tides. Some of the apparatus shown in that application is similar to part of that shown in this application; but in that application I have claimed only the methods involved, reserving the right to claim the apparatus in the present application.

The object of the present invention or apparatus as a whole is intended more especially for operating upon sunken ships lying upon sandy or muddy bottoms and partly covered with sand or mud, and in locations where strong tides or other currents or constantly-passing shipping prevent the successful use of excavating and diving armor or caissons, heretofore known and used.

The invention consists in the apparatus hereinafter illustrated and described, and pointed out in the claims.

In the accompanying drawings, Figure 1 represents my excavating apparatus and caisson operating upon the sand and mud covered hulk of an old ship containing a large amount of treasure in the lower hold, all the upper part of the ship having been removed by blasting, dredging, and the action of the elements, and with a deposit of mud over and around the remainder. Fig. 2 represents a cross-section of the same with the caisson in vertical section. Fig. 3 shows a horizontal section of the horizontal or central elbow in the jointed shaft of the caisson, showing the hinged door forming the upper end of the air-lock proper in the lower portion of the shaft. Fig. 4 shows a side elevation of the top end of the shaft with its hinged air-tight door, with mechanism for automatically closing it when water rises to it or when it is lowered in the water. Fig. 5 is a horizontal section through the three elbows on line 5 5 of Fig. 8. Fig. 6 is an enlarged horizontal section of the shaft, showing inside ladder, whose sides are used for compressed-air tubes, and also conduits for telephone and electric-light wires and cables for manipulating the lower doors, latches, &c. Fig. 7 shows the several parts of the shaft slightly separated and giving a front view of the door M of the air-lock. Fig. 8 is a vertical cross-section of the caisson with the internal stays and braces somewhat different from those shown in Fig. 2. Fig. 9 shows a plan view of the rotating mud cutting and mixing or puddling excavator. Fig. 10 is an enlarged cross-section on line 10 10 of Fig. 9.

The location of the above-referred-to sunken ship is in the swift tidal currents near Hell Gate, New York, and in the main channel in seventy feet of water, where all kinds of vessels and craft are almost constantly passing. It is impossible in that location to use a diving-bell or caisson with a shaft rigidly fixed to it, (unless lifted and removed before every tide, or four times in twenty-three hours,) because of the great force of the currents against such obstructions, and because the course of ships, &c., cannot be completely controlled in these currents and whirlpools, and they have heretofore been driven against wrecking and dredging vessels in that locality with such force as to break anchor-chains made of inch-and-a-half rods.

The object of the present invention is to overcome these difficulties and to render harmless these collisions, and to operate there and in such situations in spite of the difficulties.

First, it is necessary to remove the thick coat of mud accumulated within the broken hull, which has to be done in seventy feet of water, with its tides, passing vessels, &c. The common kinds of dredging devices cannot be operated here, because they hook under and into the timbers and débris of the wreck and fail. To prevent this, I have invented a peculiar boring or plowing cutter-head, D'. (Shown in Figs. 1, 9, and 10.) The two wings or arms D' are hollow, triangular in cross-section, the front edge sharp to cut under the mud, sand, &c., the material sliding up over the sloping top and diagonally over the open slots D''', through which the material passes as it becomes reduced to thin mud or "puddle," from which it is pumped up through the rotating tube D by the pump $D^9$ and discharged through pipe $D^8$ into a scow, or through the floating nozzle $D^{10}$ into the passing current to be washed away. The front or cutting edges of D' may be straight, as in Fig. 9, with a curved bow or rod, D'', to prevent their hooking under or behind timbers, &c., or the front edge may be curved outward and backward, as shown in Fig. 1, with a straight brace, D'', the convex backward curve causing the arms D' to slide or glance off any fixed object against which they impinge, thus preventing fouling with it.

The upright shaft or tube D is preferably made of heavy lap-welded iron pipe of suitable size. The upper end is supported in an eye or collar, $D^4$, through which it slides vertically and in which it rotates, the collar $D^4$ being pivoted so that it can move as a universal joint and permit the lower end of D to swing in all directions, the part $D^8$ being flexible hose. Just above the collar $D^4$ is the bevel-wheel $D^5$, splined to the tube D, so as to rotate with it, and which is driven by the bevel-wheel $D^6$, which is driven by any suitable power, so as to give rotary motion to D and the cutting-arms D', the upper end of D having a flange or collar which rotates in the coupling $D^7$ without rotating the part $D^8$.

The rotary-pump $D^9$ is driven by any suitable power, and draws the mixed mud and water through slots D''' in D' up through D $D^8$, and discharges it into scows; or, where there is no objection to discharging it into the passing tide or other current, it is discharged through the nozzle $D^{10}$ and carried away with the currents. The nozzle $D^{10}$ is held suspended in the current by the floating buoy B with one or more intermediate buoys, $B^4$. The object and operation of these buoys is, first, to keep the hose off the bottom or from becoming covered with the mud it discharges; second, to discharge the mud, &c., far enough away and high enough, so that the tide or current will carry it clear away; third, the flexible hose and floating buoys always cause the discharge to be in the direction toward which the water is flowing and in the proper direction for it to carry it away, and, fourth, whenever the tide or current changes direction the floating buoys and hose change automatically with it and take another position, as shown in dotted lines, $D^{11}$ and $D^{12}$.

It is obvious that this mode of discharging puddled mud, &c., is equally applicable in the use of stationary caissons, coffer-dams, the construction of subaqueous foundations, river-bed tunnels, &c.

I will now briefly describe the mechanism for guiding the position and movement of the bottom end of the pendent shaft or tube D, which mechanism I do not claim in this application, but reserve the right to make it the subject-matter of a separate application.

The weight of the shaft or tube D is sustained by the chains or cables c' c'', which pass over sheaves A' A'' and wind upon drums or spools c c. Fixed upon the same shafts with the spools c c are the spur-wheels $C^5$ and $C^6$, each of which is in gear with the intermediate pinion, C', upon whose shaft is the hand-wheel or pilot-wheel C. Now, to rotate, wheel C will wind up one of the cables c' or c'' and unwind the other one a like amount, which will simply draw the bottom of tube D to the right or to the left, according to which way the wheel C is turned, so that by movement of C D may be swung through the whole semi circle. Another set of similar gearing, set at right angles to the above, (not shown,) with other similar cables crosswise of the scow, will give a similar transverse movement to the lower end of D; or, by a combined action of the two sets, the lower end of D can be brought to any and all points, and moved at will in any and all directions.

To give perfect control of the movements of D, there must also be means for its longitudinal or vertical movement. To do this, I make one (or both) of the spools c rotatable on its shaft, and I fasten a spur-wheel, $C^7$, to the spool c to rotate with it. Into this wheel $C^7$, I make the pinion $C^4$ mesh, which has upon its shaft a hand or pilot wheel, C'''. Now, to turn this wheel C''' over to the right winds up the cable c', (without affecting the cable c'',) and consequently elevates the tube D, or to turn C''' the other way unwinds cable c', lengthens it, and lowers D. A suitable dog or locking device is used to hold the wheels $C^6$ and $C^7$ together to prevent the self-movement of $C^7$ and the unwinding of c' when not desired. Thus it will be seen that by the proper handling of these hand-wheels the bottom of tube D, with the excavator D', can be raised or lowered or moved in any direction desired by a person in the scow, the direction of the tube D and its length above water serving to indicate the depth and position of the end that is under water. The rotation of the excavator and the driving of the pump being separate and independent of guiding movements of excavator, their movements are under separate control, but they operate conjointly.

The diving-bell or caisson itself I have changed in form and in side construction, to give it great and variable weight, to offer but little resistance to passing water-currents, and to give the greatest amount and best-located working-room inside attainable with these other conditions. I make the caisson as flat and as low inside as consistent with convenience of working-room, and instead of distributing the sinking weight in the usual way around the outside or in double walls I locate the main weight in the center in a chamber or tank, F, made in the form of an inverted cone or wedge, terminating at the bottom either in a point or an edge, $F^4$, which is least in the way of working or excavating all over the inclosing open bottom. This tank F may be circular or square or rectangular in horizontal section, and may, when rectangular or wedge shaped, extend partly or all the way across the caisson, the greater proportionate length or width of wedge being required in the larger caissons and proportionately smaller in small caissons where the other metal is nearly sufficient to sink it. The shell of the tank and of the caisson itself is preferably made of boiler-iron or boiler-steel suitably riveted and calked. The inside frame-work or skeleton is made either of cast metal—as Bessemer steel, as shown in Fig. 2—or of wrought beams, girders, and stay-rods, as in Fig. 8. The tank F is preferably riveted to the roof-plates water-tight, with a man-hole, F', through which it may be filled with pig-iron or pig-lead, &c.

At F''' is a three-way cock, one branch opening from tank F to the inside of the caisson, and the other branch opening into the water outside, which may thus be let in to fill the spaces not filled by pig metal within tank F to give it that additional weight when desired to prevent water currents or tides from moving the caisson from its position; but when desired to move it the water can be drawn off by setting the cock F''' so as to admit air into F and opening the bottom cock or screw-plug F'', when the water in the tank by its greater specific gravity flows out and air flows in at F'''. If the tank F extends clear across the caisson, a suitable passage-way for workmen is made at one end or through the center, incased with a section of boiler-iron. The outside bottom edge of the caisson, consisting only of the encircling metal sheets, suitably stiffened and braced, gives free access for workmen clear out to it, and from that clear in to the center point or edge, F⁴.

When it is desired to excavate dirt or sand, &c., which can be puddled and pumped out, a sump-hole for that purpose may be made immediately under F⁴, into which material can be shoveled from all sides, and when properly mixed pumped out in the usual manner through a hose or pipe leading up through the caisson.

An important and distinctive feature of my invention also consists in the details and leading features of the construction of the tube or hollow shaft H H' for the passage of workmen to and from the caisson from above water. Heretofore all such shafts (not including small hose for supplying air to diving-armor) have been inflexible and rigidly connected to the diving-bell or caisson, so that they were immovable and unyielding without taking the caisson with them; but in my construction I provide the shaft with a flexible or jointed section near the lower end, so that it may be bent or turned over in any direction from a perpendicular to an inclined or horizontal position without moving the attached caisson. The object of this is to let the shaft turn down, first, during periods when tides or other currents are so strong as to render operations temporarily impracticable; second, when the shaft may be accidentally struck by drifting uncontrollable ships, &c., and, third, to permit the shaft to rise again by its own buoyancy as soon as the current has ceased or the colliding object has passed. The lower section, H, of this shaft is rigidly secured to the caisson, and preferably projects down inside thereof to a position conveniently accessible from the bottom of the caisson. The upper portion, H', of the shaft is preferably made of boiler-iron or boiler-steel—of say two to three feet in diameter—of a length sufficient to reach somewhat above high water where it is proposed to operate, and of a thickness of metal sufficient to resist the pressure of water of a depth where used, the lower portions being proportionately thicker and stronger than the upper portion.

On the top of the lower section, H, is secured by rivets, screw-threads, or otherwise an elbow, I'', making ninety degrees of a bend from a vertical to a horizontal direction. To this elbow I'' is attached or connected a horizontal ninety-degree elbow, I, having its two ends in vertical planes at right angles to each other, and to the other end of I is connected a third ninety-degree elbow, I', which latter is secured to the bottom of shaft H'. The horizontal joints between H and I'' and between H' and I' are rigid or removable; but the two vertical joints at the two ends of I are movable, or made to turn in the elbows to which they are connected—that is, to rotate or turn in the joints. This moving or circumferential sliding in the joints may be secured by well-known means for pipe and hose coupling, as shown in Figs. 5 and 8, where the horizontal elbow I has a flange, I⁸, upon each end, which is held loosely fitting within the flanges I⁷ by the caps or disks I⁵, which are held against I⁷ by screw-bolts, or otherwise, so as to permit the flanged ends I⁸ to turn within the ends I⁷ of elbows I' and I''. It will be seen that this free movement in these two vertical joints at right angles to each other permits the movement or turning of the upper section of the shaft H' in any and all directions, so that it can turn down to the inclined and horizontal positions shown by dotted lines H'' in Figs. 1 and 2, the elbows being put as low down as will permit such movement without H' coming in contact with the caisson. Instead of the flanges I⁷ and I⁸ on these elbows, I generally prefer the screw-threads $i$ shown in Figs. 2, 3, 5, and 7. I prefer screw-threads square in cross-section, and, to prevent the difficulty of getting such large diameter screw-threads to "take" or properly enter the corresponding female thread, I turn off a portion of the thread, leaving a blank portion, $i'$, of the same outside diameter as the smallest or inside diameter of the female screw it is to enter, so that the portion $i'$ will slide into the opposite screw that far before the threads come in contact, and thus form a guide for them when they do come in contact; then with square threads and square contact the threads cannot cross each other or lock and refuse to take. This is especially important where they have to be screwed on under water.

To assist in sustaining the weight of the shaft H' and to partly relieve the elbow-joints of strain and friction, I provide the elbow I with a trunnion, I¹⁰, in axial line with the opposite end, which serves a useful purpose in handling this elbow in putting the parts together and also to rest in a bearing when in position in the top of the bracket I''', secured to the top of the caisson. I also sometimes make a curved projecting lug or bracket, I⁴, made integral with the elbow I, for the support of a trunnion, I⁹, cast upon the elbow I', in axial line with its opposite end, as shown in Figs. 1 and 8.

The lower end of the shaft is provided with an air-lock differing somewhat from those usually provided in vertical rigid shafts. The lower door, H''', is preferably hinged to swing open outwardly and horizontally, as shown, and to close air tight. In the upper end of the horizontal elbow I is another hinged air-tight door, M, which swings back into the outside curve of the elbow, as shown in Figs. 3 and 5. These doors are provided with air-admitting valves $m''$, with stems or handles passing through the doors, so that the valves can be opened or closed from either side of the doors. Each door is also provided with a latch or lock with a handle or lever upon each side of the door and operative from both sides.

To the swinging end of the inside latch lever, $m$, is attached a rope extending through the shaft up to its top, where a pull upon the rope pulls the end of the lever $m$ up and unlatches the door H''', or, similarly, the door M, to permit them to swing open, so that water may be driven down out through the doors by compressed air from the top when the top door $h$ is locked shut to retain the air; also, the position of the latch-lever and connected rope is such that a pull on the ropes when the doors are open will swing them shut. By this arrangement, when the shaft and caisson have by any means become filled with water I can expel it and put the apparatus in working condition by, first, closing air-tight the top door, $h$; second, pulling on the ropes to unlatch the doors M and H'''; third, attaching a hose to H' and forcing compressed air into it to drive the water down out of H' H and out of the caisson; fourth, pulling the lower door, H''', shut by the rope; fifth, letting the air escape from the shaft till reduced to atmospheric pressure, when, sixth, the top door, $h$, may be opened and entrance made in the usual way—that is, by going into the lower air-lock, closing the door M, then admitting compressed air from the caisson into the air-lock through lower valve, $m''$, until the pressure in the air-lock between doors H''' and M is the same as in the caisson, when the lower door, H''', can be opened and passage be made through it into the caisson. To return from the caisson, the party enters H through door H''', then closes this door, then opens valve $m''$ in door M, and allows air to escape thereby from H till the air-pressure in it is reduced to that of the outside air, when the door M can be opened, and the party pass up out through the shaft H'.

The shaft H' being a tube of comparatively thin metal, its specific gravity as a whole, when air-filled, is less than that of the water displaced by it, so that it tends to float or automatically rise to its vertical position when not held down by currents or passing obstructions. The extreme range that shaft H' may swing to and fro is but a semi-circle, and the distance that one elbow is screwed into or out of the other by this movement is but half of one thread, or half the pitch of one thread. These threads are turned to an accurate loose fit, and they should be filled with pine tar or unctuous compound to serve as a lubricant and to repel the admission of water. As a precautionary measure, needed in case the shaft H' should become accidentally filled with water, so that it will not float or rise to a vertical position when submerged, I attach a chain or cable, B⁶, to its upper end, and to the other end of the cable B⁶ I attach a buoy, B'', which will float, as at B''', when H' is submerged at H'' upon the left of Fig. 1. This cable B⁶, thus attached in the position B⁷, affords a ready means of hauling up the shaft H' when inclosed water prevents its floating or raising itself.

To prevent the accidental filling or inflowing of water into the shaft H', I provide means for the automatic closing of the top door, $h$. From the hinge or pintle a short crank, $h''$, Fig. 4, projects, which is acted upon by a spring, $h^5$, tending to force the door shut. A latch-bar, $h'''$, is connected to the crank $h''$, the other end passing through the staple $h^4$ and having a notch in its under side, which hooks upon the stud $h^9$, which thus holds the door $h$ open. On the side of the shaft H' below the top are pivoted the arms $h^7$, carrying on their outer ends float-balls $h^8$. To intermediate points of these arms $h^7$ are connected vertical rods $h^6$, their upper ends passing through staples and resting against the latch-bar $h'''$. Now, whenever the shaft H' is turned down or the water comes up against the floats $h^8$, they are lifted (floated) by the water, and they lift the arms $h^7$ and rods $h^6$, which lift the bar $h'''$ off the stud $h^9$ and allow the spring $h^5$ to slam the door $h$ shut, where it is held by a suitable latch to prevent the entrance of water into the shaft H'. These doors are all provided with suitable elastic packing, and, the pressure being from outside inward, the harder the pressure the tighter the doors are held shut.

While the shaft has the apparent disadvantage of a compound curve, this curve presents a location for the central door to swing horizontally, instead of having to be lifted or swung vertically, as they do in straight vertical shafts, and also furnishes a small horizontal chamber upon each side of it in I and I', very convenient in opening and closing the door M.

Another important feature of my invention is the construction of the ladders in shafts H and H'. These ladders are composed of the two sides L L', (best shown in Fig. 6,) made of gas-pipe and connected by rungs or step-rods L'', bent with semicircular bows to loop around the pipes L L' and having eyes turned on their ends, through which the hook-headed screw-bolts L''' pass to clamp the rungs L'' upon the pipes L and L' by the nuts L''''. The rigid gas-pipe extends the lengths of sections H and H', being suitably attached to the inside of these sections, and preferably passing through the side of H' close to the top end by elbows and terminating outside with valves and nipples suitable for attaching hose-coupling from air-compressors. These pipes L L' are connected from the bottom of H' to the others in the top of H through the elbows by flexible hose (indicated by dotted lines in Fig. 5) passing air-tight through the flange over the doorway M, as shown in Fig. 7, the flexible hose in the elbows being made long enough to permit the partial rotation or turning of the elbows when shaft H' turns down sidewise. One of the pipe-lines, L', passes without opening from the top of H' to or near the bottom of the shaft H, or, preferably, just below the top of the caisson, where it opens into the caisson, and through which compressed air may be pumped directly into the caisson. I utilize the other line, L, as a conduit for insulated wires for electric lights and telephone used in the caisson, as at K and E', the wire K leading to the telephone and K' to electric lights. In addition to these wires, I pass ropes K'' down through pipe L, one of which connects to the latch $m$ of door M, and the other to latch-lever H⁵ of door H''', for the purpose of unlatching and for closing the doors, as hereinbefore described. This construction of a ladder gives a most compact economical form of combined ladder and air-tubes, and at the same time furnishes a safe and convenient conduit for electric wires and all other signal and operating cables, &c.

When it is desired to move the caisson from place to place, the water may be removed from tank F, as heretofore described, when it may be lifted by the chains G G', connected to suitable rig on scows or wrecking-vessel and carried to a new position and lowered.

When the shaft H' has become filled with water, the lower door, H''', being closed, of course a hose can be introduced and the water pumped out; but if more than about thirty feet deep the pump itself must be lowered into it to within that distance from the bottom; or, if air-pressure be used to drive the water down out of the shaft and caisson the upper door, $h$, must be well secured to stand the pressure equal to the weight of a column of water the depth to which it is forced. Then a valve, as $m'''$ in M and H''', opens downward like safety-valves whenever the pressure above them becomes greater than that below them, so that they will open downward and permit water and air to pass down through them, but will close whenever the pressure below is equal to or greater than that above them; or the doors M and H''' themselves may be made self-closing by springs or weights to hold them shut in their normal condition; but whenever the pressure from above becomes greater than below they will open enough to permit water and air to pass down through them until compressed air takes the place of water in the shaft and caisson.

Where the force of the tides is such at their highest as to require the temporary abandonment of the caisson, as a precautionary measure during such intervals it is sometimes necessary to fill the caisson with water to prevent liability of the tides shoving it away or overturning it. To thus fill it, it is only necessary to allow the compressed air to escape up out through pipe L', when water will fill the caisson and pipe L', but not the shaft H H'. If it be desired also to fill the shaft H up to door M, it may be done by having a valve or cock opening into pipe L' or L from the air-lock at M. With this large addition of water to the caisson's weight of metal, it holds it in place with great firmness, so that there is no danger of its being disturbed by tidal currents. On returning to work, a compressed-air hose is attached to the top of pipe L', and compressed air sent down the pipe L' to again drive the water out of the caisson, when entrance may be made into the caisson and work proceed therein.

Having thus described my invention, what I claim, and desire to secure by Letters Patent, is—

1. A diving-bell or caisson provided with a fixed portion of shaft H, in combination with a swinging floating portion, H', these parts being united by flexible connections to constitute a universal joint and to permit the passage of men therethrough to and from the caisson, substantially as described.

2. A portable caisson, in combination with an air-filled shaft closed at top and bottom and having a flexible portion whereby water-currents may carry it into an inclined position below water-surface, and whereby the inclosed air will cause it to float or its upper end to rise above water-surface whenever such currents cease, substantially as set forth.

3. A submerged caisson, in combination with a jointed shaft attached thereto and adapted to yield or leave its vertical position when struck by moving ships to permit passage over or past it, and to automatically return to its vertical position again when such colliding ship has passed it, substantially as set forth.

4. A portable caisson provided with a shaft having air-tight doors at its top and bottom and a rope or connection from the top of the shaft to the latch of the lower door, whereby the lower door may be unlatched while the shaft and caisson are full of water to permit the water to be driven down out of the shaft by compressed air, and by which rope said lower door may be pulled shut and water prevented from returning to the air-lock when air-pressure is lowered therein, substantially as set forth.

5. A portable caisson provided with a shaft having an air-tight door at its top, a door or doors near its bottom, means for admitting compressed air into the shaft and thereby driving the water down out of the shaft, and the means for preventing the return of the water into the shaft when out by the closing of a lower door or valve, so that when the air-pressure therein is lowered the upper door can be opened and entrance be made from the top through the shaft into the air-lock, as set forth.

6. A portable caisson provided with an air-lock at its lower end, having its two air-tight doors and an additional air-tight door at the top of the shaft, whereby the water may be driven down out of the shaft and caisson by compressed air, substantially as set forth.

7. A passage-way or shaft of a diving-bell or portable caisson composed of upper and lower vertical portions, an intermediate horizontal portion, and air-lock doors at the top and bottom ends, and also an air-lock door in the intermediate horizontal portion, substantially as set forth.

8. A vertical shaft of a diving-bell or portable caisson having a horizontal section which includes the upper end of the air-lock, a door hinged to swing horizontally therein, and with a horizontal landing or terminus of the vertical portions of the shaft upon each side of said upper air-lock door M, as set forth.

9. A passage-way or shaft of a diving-bell or portable caisson having between and connecting its cylindrical end portions three connected elbows, the middle one of which lies in a horizontal plane, its two ends in vertical planes at right angles to each other and adapted to rotate or oscillate in their bearing-connections with the adjacent elbows, whereby the upper portion of the shaft is free to move in any direction from a perpendicular, while the lower portion remains in vertical position, as set forth.

10. A passage-way or shaft of a diving-bell or caisson provided with a door at its top end adapted to be automatically released and closed by the rising thereto of water to prevent the water from entering the shaft, substantially as set forth.

11. An entrance-shaft of a diving-bell or caisson provided with a hinged spring-actuated door at its upper end, in combination with floats adapted to be lifted by approaching water, whereby the door is released and closed to prevent the admission of water into the shaft, substantially as set forth.

12. An entrance-shaft, H', of a caisson provided with a hinged door, $h$, having a lug or crank, $h''$, spring $h^5$, latch-bar $h'''$, and catch $h^9$, in combination with floats $h^8$, levers $h^7$, and rods $h^6$, substantially as shown.

13. A diving-bell or caisson, E, having a rigid shaft, H, and a swinging portion, H', in combination with a floating buoy, B'', attached thereto by a chain or cable, B$^6$, substantially as and for the purpose set forth.

14. A diving-bell or portable caisson having a centrally-fixed compartment adapted to hold weights or material for sinking the caisson, said compartment being tapered to a narrow edge or point at its lower end, substantially as set forth.

15. A diving-bell or portable caisson comprising an external shell, in combination with an internal central weight-receiving compartment, F, wide at its top and narrow at its bottom, substantially as set forth.

16. A diving-bell or portable caisson comprising an external metallic shell and an internal central weight-receiving compartment, F, terminating in a narrow or pointed lower end, in combination with a system of intermediate braces, E''.

17. A diving-bell or portable caisson comprising an outside shell, E, a central weight-receiving compartment, F, surrounded by an annular working-chamber, E', substantially as set forth.

18. In combination with the shaft of a caisson, an inside ladder composed of tubular sides spaced apart and connected by rungs or rounds secured thereto to constitute the ladder, said tubular sides being adapted to convey compressed air into the caisson, and also to serve as conduits for electric-light and telephone wires, substantially as set forth.

19. A ladder within the shaft of a caisson, composed of tubular sides adapted to convey compressed air from an outside air-compressor into the interior of the caisson, in combination with electric conducting-wires inclosed within and protected by the tubular sides of said ladder and their connections, substantially as and for the purpose set forth.

20. The combination, with a caisson, of a ladder whose tubular sides are adapted to convey compressed air down the shaft of the caisson and to also serve as conduits for electric wires, and ropes for manipulating mechanism within the air-lock or caisson, substantially as set forth.

JOHN H. BROWN.

Witnesses:
WM. H. HARRIS,
JNO. WALKER.